(12) United States Patent
Nagasawa et al.

(10) Patent No.: US 12,736,431 B2
(45) Date of Patent: Sep. 15, 2026

(54) METHOD OF DETECTING LEAKAGE OF SUBSTRATE HOLDER

(71) Applicant: EBARA CORPORATION, Tokyo (JP)

(72) Inventors: Yosuke Nagasawa, Tokyo (JP); Tensei Sato, Tokyo (JP); Ryuya Koizumi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 282 days.

(21) Appl. No.: 18/494,563

(22) Filed: Oct. 25, 2023

(65) Prior Publication Data

US 2024/0192075 A1 Jun. 13, 2024

(30) Foreign Application Priority Data

Dec. 12, 2022 (JP) ................................ 2022-197786

(51) Int. Cl.
*G01M 3/06* (2006.01)

(52) U.S. Cl.
CPC .................................... *G01M 3/06* (2013.01)

(58) Field of Classification Search
CPC ...................................................... G01M 3/06
See application file for complete search history.

(56) References Cited

U.S. PATENT DOCUMENTS 6,252,980 B1 * 6/2001 Schwartz ................ B67C 3/007 356/427
10,488,292 B1 * 11/2019 Rabb ..................... G01M 3/146
2002/0075984 A1 * 6/2002 Knecht .................. G21C 17/07 376/253
2018/0135198 A1 5/2018 Ogata et al.
2022/0255098 A1 * 8/2022 Tanaka .................. G01M 3/226
2022/0373423 A1 * 11/2022 Høydahl Sørli .... G01M 3/3254
2023/0266195 A1 * 8/2023 Silva ....................... G01M 3/22 382/106
2025/0044177 A1 * 2/2025 Iizuka ................. G01M 13/003
2025/0305904 A1 * 10/2025 Martin .................... G01M 3/24

FOREIGN PATENT DOCUMENTS

JP H04-020831 A 1/1992
JP H04-054423 A 2/1992
JP 2003-277995 A 10/2003
JP 6746474 B2 8/2020
JP 7008863 B1 1/2022
JP 7097522 B2 7/2022
JP 2002-275682 A 9/2022
WO WO 2022/149257 A1 7/2022

* cited by examiner

*Primary Examiner* — Eric S. McCall
(74) *Attorney, Agent, or Firm* — BakerHostetler

(57) ABSTRACT

There is provided a method of detecting a leakage of a substrate holder in an apparatus for plating. The method of detecting the leakage comprises: placing the substrate holder that holds a substrate, into a tank that is filled with a liquid; supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid and thereby detect a leakage of the substrate holder.

20 Claims, 5 Drawing Sheets

100
101A
101B
102
102
102
102
103
104
105
105
105A
106
107
107A
107B
11A (11)
11B (11)
108
109
110
111
112
113
114
115
120
121
121
121
122
150
150A
150B

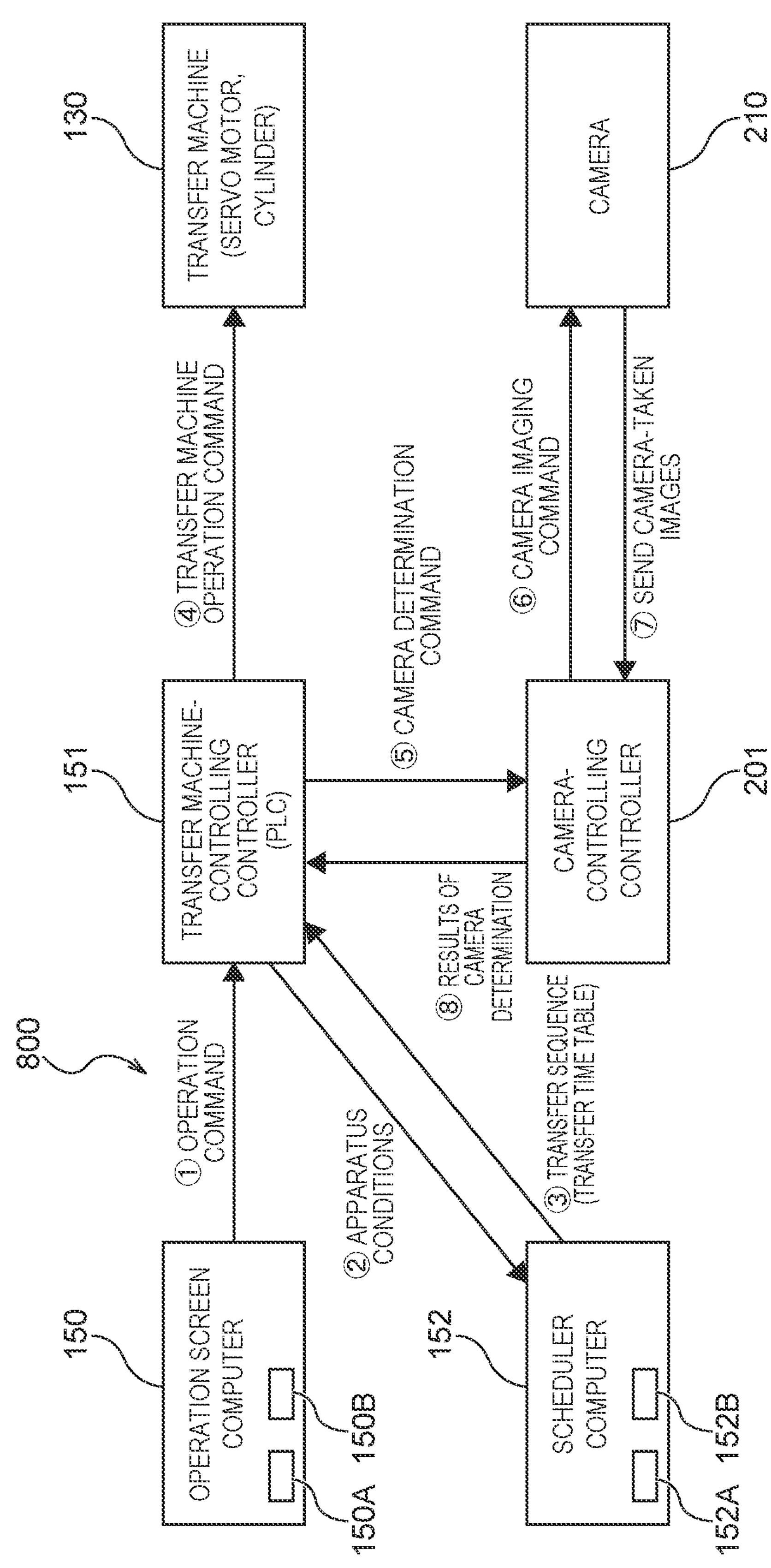
Fig. 3
800
150
OPERATION SCREEN COMPUTER
150A
150B
152
SCHEDULER COMPUTER
152A
152B
151
TRANSFER MACHINE-CONTROLLING CONTROLLER (PLC)
130
TRANSFER MACHINE (SERVO MOTOR, CYLINDER)
201
CAMERA-CONTROLLING CONTROLLER
210
CAMERA
① OPERATION COMMAND
② APPARATUS CONDITIONS
③ TRANSFER SEQUENCE (TRANSFER TIME TABLE)
④ TRANSFER MACHINE OPERATION COMMAND
⑤ CAMERA DETERMINATION COMMAND
⑥ CAMERA IMAGING COMMAND
⑦ SEND CAMERA-TAKEN IMAGES
⑧ RESULTS OF CAMERA DETERMINATION

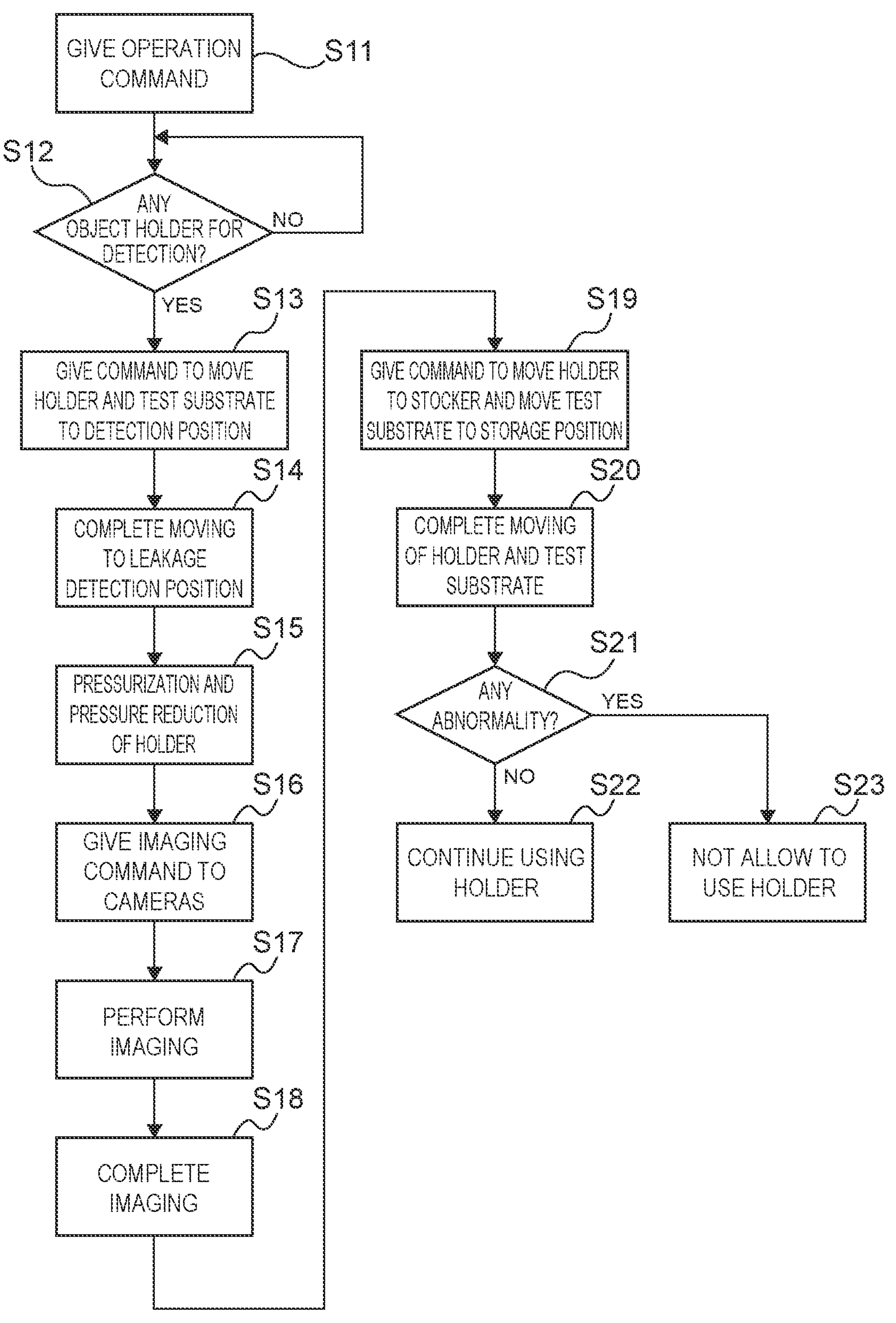
Fig. 4
GIVE OPERATION COMMAND
S11
S12
ANY OBJECT HOLDER FOR DETECTION?
NO
YES
S13
GIVE COMMAND TO MOVE HOLDER AND TEST SUBSTRATE TO DETECTION POSITION
S14
COMPLETE MOVING TO LEAKAGE DETECTION POSITION
S15
PRESSURIZATION AND PRESSURE REDUCTION OF HOLDER
S16
GIVE IMAGING COMMAND TO CAMERAS
S17
PERFORM IMAGING
S18
COMPLETE IMAGING
S19
GIVE COMMAND TO MOVE HOLDER TO STOCKER AND MOVE TEST SUBSTRATE TO STORAGE POSITION
S20
COMPLETE MOVING OF HOLDER AND TEST SUBSTRATE
S21
ANY ABNORMALITY?
YES
NO
S22
CONTINUE USING HOLDER
S23
NOT ALLOW TO USE HOLDER

METHOD OF DETECTING LEAKAGE OF SUBSTRATE HOLDER

CROSS REFERENCE TO RELATED APPLICATION

This application claims priority to Japanese Patent Application No. 2022-197786 filed Dec. 12, 2022, the entire contents of which are hereby incorporated by reference.

TECHNICAL FIELD

The present disclosure relates to a method of detecting a leakage and an apparatus for detecting a leakage and more specifically relates to a method of detecting a leakage and an apparatus for detecting a leakage configured to detect a leakage of a substrate holder in an apparatus for plating. The present disclosure also relates to an apparatus for plating and more specifically an apparatus for plating having a function of detecting a leakage of a substrate holder.

BACKGROUND ART

A substrate holder that holds a substrate in an attachable and detachable manner is used in an electrolytic plating apparatus configured to plate substrates such as wafers. The substrate held by the substrate holder is soaked in a plating solution. When a voltage is applied between an anode and the substrate, electric current passes through the plating solution and flows from the anode to the substrate, so as to plate a surface of the substrate in the presence of the plating solution. The substrate holder used for electrolytic plating has an electric contact that is brought into contact with a plating surface or a surface to be plated (for example, a seed layer) of the substrate. The substrate holder is soaked in the plating solution during plating of the substrate. The substrate holder has a sealing function to prevent penetration of the plating solution, with a view to preventing the plating solution from coming into contact with the electric contact. When the substrate holder holds the substrate, a sealed space is formed inside of the substrate holder, and the electric contact is placed in this sealed space. In the case where a leakage of the plating solution into the substrate holder (into the sealed space) due to some defect or trouble (for example, unevenness of the substrate, deterioration of a seal of the substrate holder or the like), the plating solution penetrating into inside of the substrate holder is likely to cause corrosion and/or dissolution of the seed layer. This may cause a conduction failure and lower the uniformity of plating.

When there is a clearance between a substrate and a substrate holder used in an apparatus for manufacturing semiconductor (for example, an apparatus for plating rectangular substrates), a chemical solution enters inside of the substrate holder (leakage). This may cause a short circuit of a power feeding portion or may cause the remaining liquid to affect the process performance. Presently proposed leakage detection methods include a leakage detection method by a differential pressure technique in a fixing mechanism (substrate attaching/detaching mechanism) (as described in PTL 1: Japanese Patent No. 6,746,474) and a leakage detection method by checking electrical continuity in a pre-wet module and in a blow module (as described in PTL 2: Japanese Patent No. 7,097,522).

CITATION LIST

Patent Literatures

PTL 1: Japanese Patent No. 6,746,474
PTL 2: Japanese Patent No. 7,097,522

SUMMARY OF INVENTION

Technical Problem

Both the leakage detection method by the differential pressure technique and the leakage detection method by checking the electrical continuity, however, have problems in the detection accuracy or the adjustment means (difficulties in tuning). A leakage detection method by another technique has accordingly been demanded. The electrical continuity technique requires strict adjustment of a reference value (an electric current value or a resistance value) for accurate detection of a leakage and may have a difficulty in adjusting the reference value. This technique also has a difficulty in detection of a leakage at some location where a detector (for example, a detection electrode) is placed. The differential pressure-based detection method adopted at the substrate attaching/detaching mechanism is, on the other hand, not suitable for detection of a minute leakage and has a relatively low accuracy in detection of a leakage in the present state. Furthermore, both the techniques require a substrate to be attached to a substrate holder and to be transferred, for the purpose of detection of the presence or the absence of a leakage. This causes a problem that the substrate prior to a plating process comes into contact with the substrate holder and is exposed to a liquid.

An object of the present disclosure is to solve at least part of the problems described above. One object of the present disclosure is to improve detection of a leakage of a substrate holder in an apparatus for plating.

Solution to Problem

According to one aspect of the present disclosure, there is provided a method of detecting a leakage that detects a leakage of a substrate holder in an apparatus for plating. The method of detecting the leakage comprises: placing the substrate holder that holds a substrate, into a tank that is filled with a liquid; supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid and thereby detect a leakage of the substrate holder.

BRIEF DESCRIPTION OF DRAWINGS

FIG. 3 is an explanatory view illustrating a control configuration of the substrate processing apparatus;

FIG. 4 is a flowchart showing a leakage detection process;

DESCRIPTION OF EMBODIMENTS

The following describes one embodiment of the present disclosure with reference to the drawings. In the respective embodiments described below, identical or equivalent members are expressed by identical reference signs with omission of duplicated description. In the description hereof, the expressions such as "upper" or "upward", "lower" or "downward", "left" or "leftward" and "right" and "rightward" are used. These expressions indicate the positions, the orientations, and the directions on the sheet surface of the illustrated drawings for the purpose of explanation, and these positions, orientations and directions may be different from those in the actual arrangement, for example, when using the apparatus.

Figure 1:
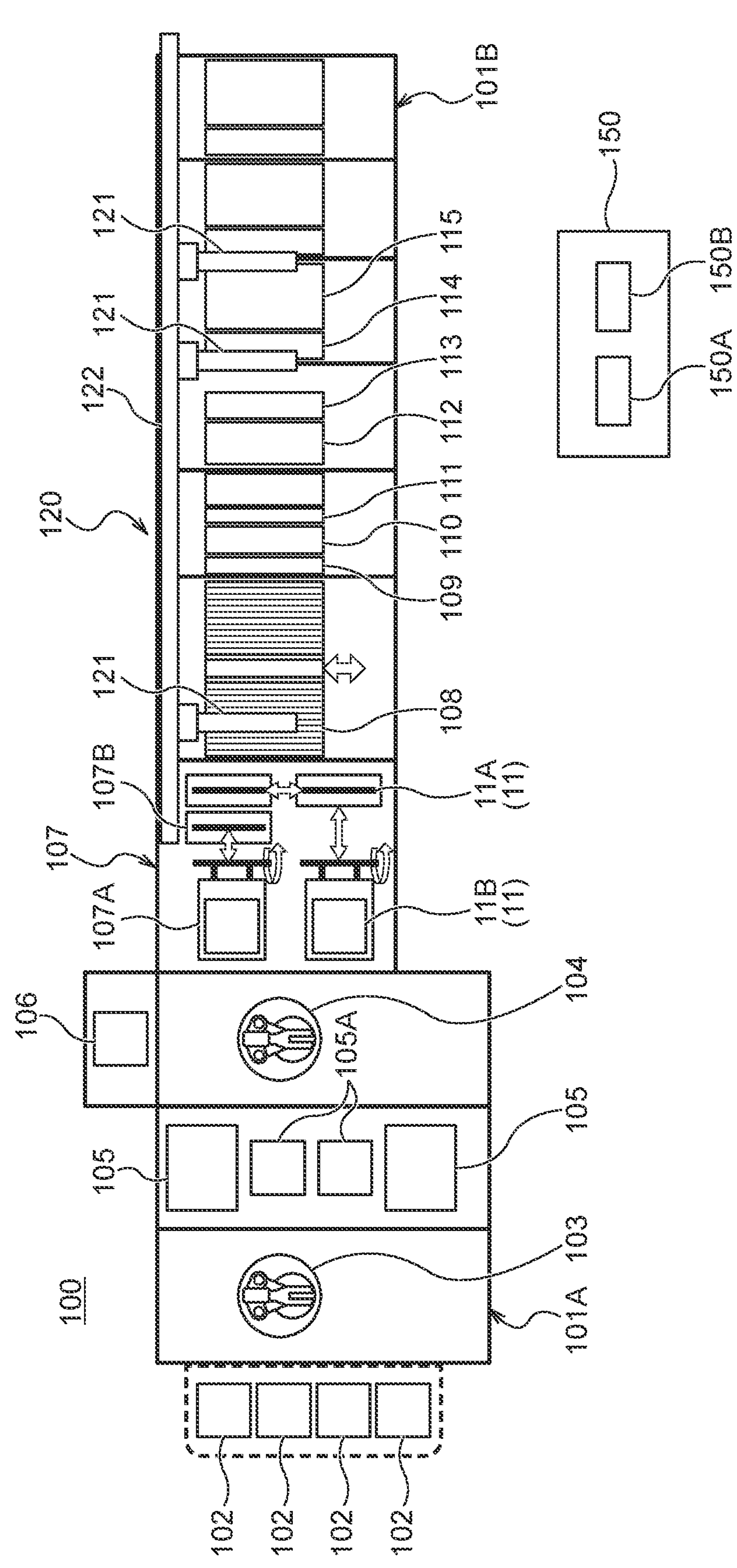
FIG. 1 is a general layout drawing illustrating a substrate processing apparatus according to one embodiment.

FIG. 1 is a general layout drawing illustrating a substrate processing apparatus according to one embodiment of the present disclosure. This embodiment illustrates a plating apparatus 100 that is an electrolytic plating apparatus as one example of the substrate processing apparatus. Although this embodiment illustrates a vertical electrolytic plating apparatus as an example, the present disclosure is applicable to any of substrate processing apparatuses including any plating apparatuses (for example, a horizontal electrolytic plating apparatus and a non-electrolytic plating apparatus).

The plating apparatus 100 is mainly comprised of a loading/unloading station 101A configured to load a substrate W as an object to be processed or a processing object to a substrate holder 11 and to unload the substrate W from the substrate holder 11; and a processing station 101B configured to process the substrate W. In this illustrated example, the substrate W is a rectangular substrate W. The substrate W may be a circular substrate, a rectangular or another polygonal substrate or a substrate in any other shape. The substrate W may be a semiconductor wafer, a glass substrate, a liquid crystal substrate, a printed circuit board, or any other processing object.

The loading/unloading station 101A includes a plurality of cassette tables 102, transfer robots 103 and 104, cleaners 105, a test substrate placing stage 106 which one or a plurality of substrates for testing (test substrates Wt) are placed on, and a substrate attaching/detaching station 107. A cassette (for example, FOUP) with a substrate placed therein is placed on the cassette table 102. According to the embodiment, the cleaners 105 are rinse dryers having a drying function (cleaning and drying device/module) and are configured to clean and dry the substrate W after a plating process. The cleaner 105 may be either a type that has a separate tank or module for cleaning and a separate tank or module for drying, or a type that has a common tank or module for both cleaning and drying. According to another embodiment, the cleaner 105 may be replaced by a dryer configured to perform only drying. For example, an air knife configured to spray the air (for example, dried air or nitrogen) to the substrate may be employed for the drying mechanism of the cleaner 105. This illustrated example is provided with two cleaners 105, but one cleaner 105 or three or more cleaners 105 may be provided. One or a plurality of temporary placing tables 105A may be provided between the transfer robot 103, the transfer robot 104 and the cleaners 105 to allow the substrate W to be temporarily placed thereon in the course of transferring the substrate W between the transfer robot 103, the transfer robot 104 and the cleaners 105. The substrate attaching/detaching station 107 includes one or a plurality of substrate attaching/detaching devices (107A, 107B) configured to attach and detach the substrate W to and from the substrate holder 11. In this illustrated example, the substrate attaching/detaching device (107A, 107B) includes a rotating device 107A and a support station 107B. In the state that the rotating device 107A supports a second holding member 11B of the substrate holder 11 in a horizontal attitude, the substrate W is placed on the second holding member 11B by the transfer robot 104. The rotating device 107A subsequently rotates the second holding member 11B that holds the substrate W, to a vertical attitude and presses the second holding member 11B against a first holding member 11A that is held in the vertical attitude by the support station 107B, so as to place the substrate W between the first holding member 11A and the second holding member 11B. The first holding member 11A and the second holding member 11B are fixed to each other by means of a fixation mechanism (for example, a clamp). The substrate W is held by the substrate holder 11 in this manner.

The processing station 101B includes a stocker 108 configured to store and temporarily place the substrate holder 11 therein, a substrate holder cleaning device 109 configured to clean the substrate holder 11, a pre-wet module 110, a temporary placing table 111, a pre-soak rinse module 112, a blow module 113, a rinse module 114 and a plating process module 115. Any or each of these modules may be referred to as the processing module. Part or a plurality of processing modules out of the substrate holder cleaning device 109, the pre-wet module 110, the pre-soak rinse module 112, the rinse module 114, and the plating process module 115 may be provided with a processing tank that holds and retains a predetermined processing liquid therein.

The pre-wet module 110 is configured to soak the substrate W in a processing liquid (for example, pure water) and to replace the air in an opening (for example, a resist opening) on the surface of the substrate, with the pure water. The pre-soak rinse module 112 is configured to remove an oxide film on the surface of a conductive layer, such as a seed layer, formed on the surface of the substrate, by etching. The pre-soak rinse module 112 is also configured to clean the substrate after pre-soaking along with the substrate holder 11, by using a cleaning liquid (for example, pure water) that is a processing liquid. The blow module 113 is configured to drain the liquid from the substrate after cleaning. The rinse module 114 is configured to clean the substrate after plating along with the substrate holder 11, by using a cleaning liquid (for example, pure water) that is a processing liquid.

The plating process module 115 includes a plurality of plating cells provided with an overflow tank (not shown). Each of the plating cells places one substrate W inside thereof and soaks the substrate W in a plating solution retained or kept inside thereof, so as to plate the surface of the substrate by copper plating or the like. The type of the plating solution used herein is not specifically limited but may be any of various plating solutions according to the application. In the case where one substrate is subjected to a plurality of different plating processes, an additional plating process module or additional plating process modules may be provided inside of the plating apparatus 100.

The plating apparatus 100 has a substrate holder transfer device 120 that is located on a lateral side of the above respective devices and modules, that is configured to transfer the substrate holder between these devices and modules, and that may employ, for example, a linear motor type. This substrate holder transfer device 120 includes one or a plurality of transporters (conveyors) 121. The transporter 121 runs on a rail 122. In this illustrated example, three transporters 121 are provided, and two transporters 121 are used. A first transporter 121 located nearest to the substrate attaching/detaching station 107 is configured to transfer the substrate holder 11 between, for example, the stocker 108, the substrate attaching/detaching station 107, the substrate holder cleaning device 109, the pre-wet module 110, the pre-soak rinse module 112 and the blow module 113. A second transporter 121 located second nearest to the substrate attaching/detaching station 107 is configured to transfer the substrate holder 11 between, for example, the pre-soak rinse module 112, the blow module 113, the rinse module 114, and the plating process module 115. Three transporters are used according to the specification of the plating apparatus 100 (the number of modules installed therein). According to another embodiment, only one transporter 121 may be provided to transfer the substrate holder 11 between the respective devices and modules described above. According to another embodiment, four or more transporters 121 may be provided. This configuration of the plating apparatus 100 is only illustrative, and the plating apparatus 100 may employ any other configuration.

In the plating apparatus 100, the transfer robot 103 takes out an unprocessed substrate W from a cassette placed on the cassette table 102 and transfers the substrate W to the transfer robot 104 via the temporary placing table 105A. The transfer robot 104 carries the substrate W into the substrate attaching/detaching station 107. In the substrate attaching/detaching station 107, the substrate W is attached to the substrate holder 11 that is taken out of the stocker 108. The substrate W attached to the substrate holder 11 is transferred by the transporter 121 to the pre-wet module 110 to be subjected to a pre-wetting process and is subsequently transferred to the pre-soak rinse module 112 to be subjected to a pre-soaking process and a rinsing process.

The substrate W after the rinsing process is transferred by the transporter 121 to the plating process module 115 to be soaked in the plating solution. This performs a plating process to form a metal film on the substrate W. In the case where a plurality of different types of plating processes are performed, the substrate W is sequentially transferred to a plurality of plating process modules to be subjected to the respective plating processes. The substrate W after the plating process is transferred by the transporter 121 to the rinse module 114 to be subjected to a rinsing process and is then transferred to the blow module 113 to be subjected to a rough drying process. The substrate W is then transferred by the transporter 121 to the substrate attaching/detaching station 107 to be detached from the substrate holder 11. The substrate W detached from the substrate holder 11 is transferred by the transfer robot 104 to the cleaner 105 to be subjected to a cleaning and drying process and is subsequently placed into the cassette on the cassette table 102 by the transfer robot 103. The substrate holder 11 is, on the other hand, returned to the stocker 108 by the transporter 121.

In this plating apparatus 100, a leakage detection (leakage inspection) process is performed to detect whether there is any leakage of a liquid (a processing liquid such as pure water or a chemical solution) into an internal space (a sealed space or a space provided to seal an outer circumferential portion of the substrate) of the substrate holder 11 that holds the substrate W. A test substrate Wt is used in the leakage detection process according to the embodiment. Prior to the leakage detection process, the transfer robot 104 takes out the test substrate Wt from the test substrate placing stage 106 and carries the test substrate Wt into the substrate attaching/detaching station 107. The transporter 121, on the other hand, take out the substrate holder 11 from the stocker 108 and carries the substrate holder 11 into the substrate attaching/detaching station 107. After the substrate attaching/detaching device (107A, 107B) attaches the test substrate Wt to the substrate holder 11 in the substrate attaching/detaching station 107, the transporter 121 carries the substrate holder 11 into the pre-wet module 110. In the pre-wet module 110, the substrate holder 11 that holds the test substrate Wt is subjected to a leakage detection process (described later). After the leakage detection process, the transporter 121 takes out the substrate holder 11 from the pre-wet module 110 and carries the substrate holder 11 into the substrate attaching/detaching station 107 via the temporary placing table 111. The test substrate Wt is taken out of the substrate holder 11 in the substrate attaching/detaching station 107, is transferred by the transfer robot 104 to the cleaner 105 to be subjected to a cleaning and drying process, and is subsequently returned to the test substrate placing stage 106 by the transfer robot 104. The substrate holder 11 is, on the other hand, returned to the stocker 108 by the transporter 121.

[Configuration of Leakage Detection Apparatus]

Figure 2A:
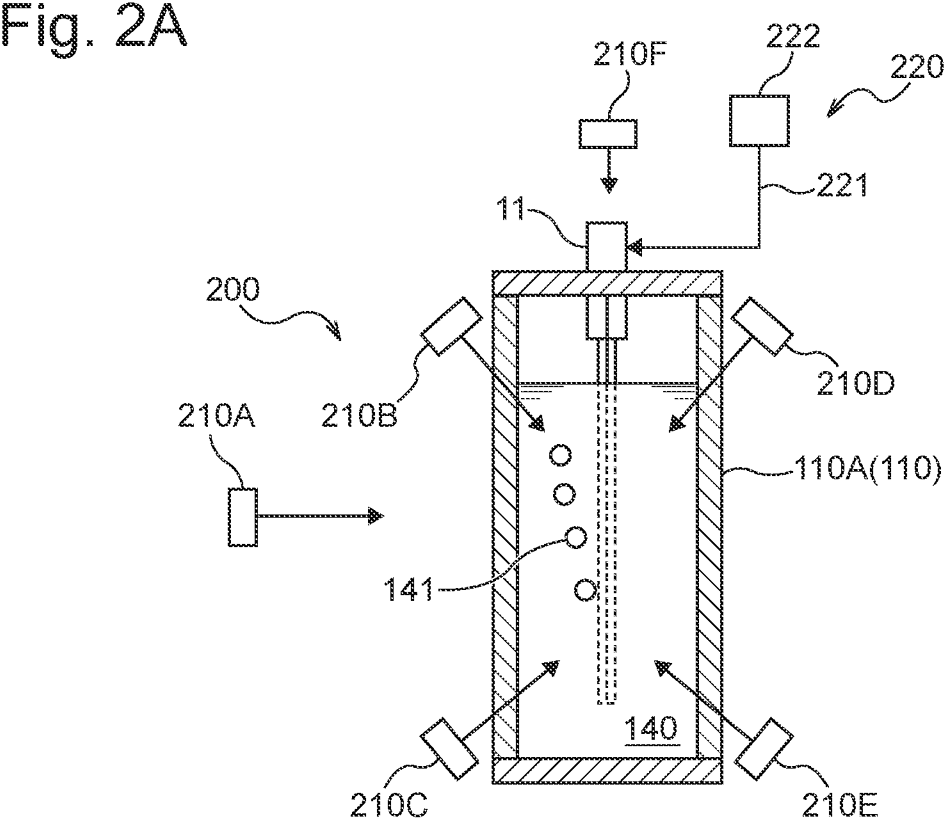
FIG. 2A is a side view illustrating a configuration example of a leakage detection apparatus.
Figure 2B:
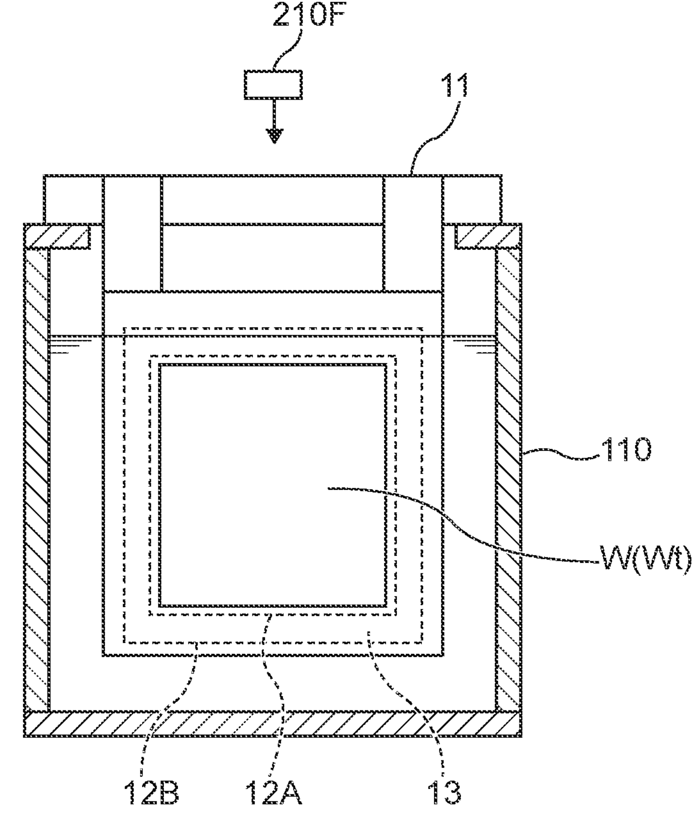
FIG. 2B is a front view illustrating the configuration example of the leakage detection apparatus.

FIG. 2A is a side view illustrating a configuration example of a leakage detection apparatus. FIG. 2B is a front view illustrating the configuration example of the leakage detection apparatus. According to this embodiment, the pre-wet module 110 is described as an example of a processing module that performs detection of a leakage of the substrate holder 11. The processing module that performs detection of a leakage of the substrate holder 11 may be another processing module configured to keep or retain therein a liquid which the substrate holder 11 is soaked in. A processing module with a processing tank that keeps or retains therein a processing liquid having a low degree of transparency may, however, have a difficulty in photographing gas bubbles described later. The processing module that performs detection of a leakage of the substrate holder 11 may thus be any processing module other than this type of processing module (for example, the plating process module 115). For example, the substrate holder 11 includes the first holding member 11A and the second holding member 11B and is provided with a seal that protects an outer circumferential portion (a portion provided with a contact which a plating current is supplied to) of the substrate W (or the test substrate Wt) from a processing liquid 140, while the substrate W (Wt) is placed between and held by the first holding member 11A and the second holding member 11B. This substrate holder 11 has an internal space (sealed space) 13 that places the outer circumferential portion of the substrate W (Wt) therein when the outer circumferential portion of the substrate W (Wt) is sealed and held by seals 12A and 12B (hereinafter collectively referred to as seal 12). In the case where the seal 12 has a leakage, when the substrate holder 11 is soaked in the processing liquid 140, a gas present in the internal space 13 of the substrate holder 11 is leaked in the form of gas bubbles 141 from a leakage location of the seal 12 into the processing liquid. According to this embodiment, a leakage of the substrate holder 11 detected by detection of the gas bubbles 141 leaked into the processing liquid 140.

The seal 12A is called an inner seal and is configured to seal between the substrate W (Wt) and the first holding member 11A or the second holding member 11B. The seal 12B is called an outer seal and is configured to seal between the first holding member 11A and the second holding member 11B. The substrate holder 11 is provided with the inner seal 12A and the outer seal 12B according to this embodiment but may be provided with only an inner seal according to the structure of the substrate holder. In the case of a substrate holder for double-sided plating, the respective faces of the substrate may be provided with the seal 12A.

The substrate used for detection of a leakage of the substrate holder 11 is not the substrate W (also called the actual substrate W) that is to be actually plated but is the test substrate Wt that is not used for actual plating. This prevents the substrate W used for plating from being contact with the processing liquid 140. In place of or in addition to detection of a leakage using the test substrate Wt, detection of a leakage of the substrate holder 11 may be performed using the actual substrate W in a processing tank (any processing tank where the actual substrate W is soaked in the liquid, for example, the pre-wet module 110) in the course of transfer of the actual substrate W.

In the case where the test substrate Wt is expendable, the test substrate Wt may be replaceable from outside during operation of the plating apparatus 100, and a leakage checking operation (leakage detection process) may not be performed during replacement. A controller 800 may be configured to count the use frequency of the test substrate Wt (the frequency of use for the leakage detection process) and, when the use frequency reaches a predetermined number of times, to prohibit any more leakage detection process from being performed by using the current test substrate Wt (and/or to replace the current test substrate Wt). This suppresses a false detection of a leakage due to, for example, deterioration of the test substrate Wt and enables the leakage detection process to be performed with the higher accuracy.

According to this embodiment, as shown in FIG. 2A and FIG. 2B, a leakage detection apparatus 200 is provided in the pre-wet module 110. The leakage detection apparatus 200 includes one or a plurality of (six in the illustrated example) cameras 210 and a gas injection device 220. For example, pure water is stored as the processing liquid 140 in a processing tank 110A of the pre-wet module 110.

In this illustrated example, one or the plurality of cameras 210 include a camera 210A located to be opposed to a front face of the substrate holder 11 and to take an image of the processing liquid 140; a camera 210B located on a front side of the substrate holder 11 and above the center of the substrate Wt to take an image of the processing liquid 140 obliquely downward from above; a camera 210C located on the front side of the substrate holder 11 and below the center of the substrate Wt to take an image of the processing liquid 140 obliquely upward from below; a camera 210D located on a rear side of the substrate holder 11 and above the center of the substrate Wt to take an image of the processing liquid 140 obliquely downward from above; a camera 210E located on the rear side of the substrate holder 11 and below the center of the substrate Wt to take an image of the processing liquid 140 obliquely upward from below; and a camera 210F located to take an image of the processing liquid 140 downward from a position above the substrate holder 11 and above the liquid surface of the processing liquid 140. The cameras 210A to 210E are omitted from the illustration of FIG. 2B. In the description below, the group of the cameras 210A to 210F or each of the cameras 210A to 210F may be referred to as the cameras 210 or as the camera 210.

One or the plurality of cameras 210 may be placed inside of the processing tank 110A and/or outside of the processing tank 110A as long as the camera 210 can take an image of the processing liquid surrounding the substrate holder 11. In the case where the camera 210 is placed outside of the processing tank 110A, the entirety or part of a wall of the processing tank 110 may be comprised of a transparent portion and an image of the processing liquid 140 is taken by the camera 210 via the transparent portion.

One or the plurality of cameras 210 may be fixed to the periphery of the processing tank 110A by means of any fixation element or may be attached to the transporters 121.

Figure 5A:
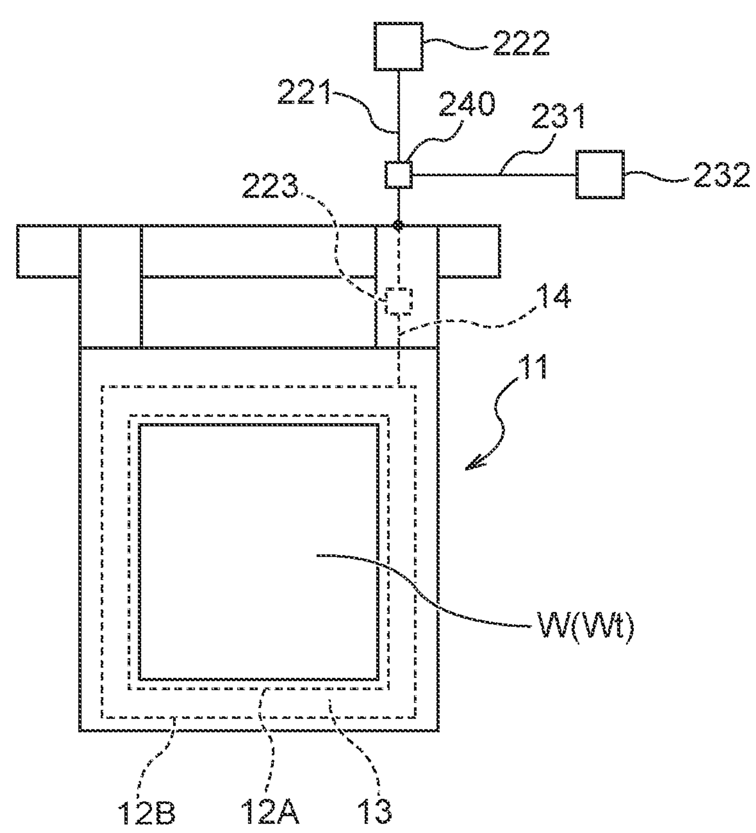
FIG. 5A is a diagram illustrating a connection configuration example of a pump for pressure reduction with a substrate holder.
Figure 5B:
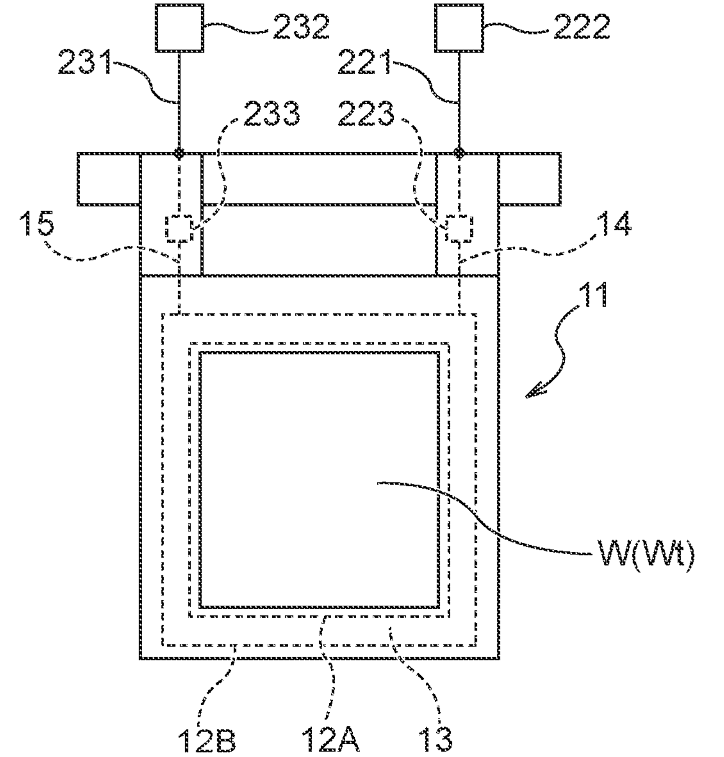
FIG. 5B is a diagram illustrating another connection configuration example of the pump for pressure reduction with the substrate holder.

The gas injection device 220 is a device that is connectable with the substrate holder 11 to be in fluid connection with the internal space 13 of the substrate holder 11 and that is configured to inject a gas into the internal space 13 of the substrate holder 11 and thereby pressurize the internal space 13. The gas injection device 220 may include a gas injection tube 221 connectable with the substrate holder 11, and a gas supply source 222 for a gas such as the air or an inert gas. In the case where the gas supply tube 221 is connected with a gas supply source placed outside of the plating apparatus 100, it may be thought that the gas injection device 220 includes only the gas injection tube 221. The gas injection tube 221 may include a coupler or a connector used for connection with the substrate holder 11. For example, it may be configured that a joint that communicates with a passage (including an opening) 14 communicating with the internal space 13 of the substrate holder 11 (shown in FIG. 5A and FIG. 5B) and a joint on the gas injection tube 221-side are fit in each other. In one configuration example, the gas injection tube 221 is moved by means of an actuator to be automatically connected with the substrate holder 11 when the substrate holder 11 is carried into the pre-wet module 110. As shown in FIG. 5A and FIG. 5B, the substrate holder 11 may be provided with a switching device (for example, a valve) 223 configured to open and close the passage 14 that communicates with the internal space 13. The switching device 223 may be opened to inject a gas into the internal space 13 via the passage 14 by the gas injection device 220 and may be closed to seal the internal space 13. In the case where there is no need to seal the passage 14 after injection of the gas, the switching device 223 may be omitted. The layout of the passage 14 and a passage 15 (described later) of the substrate holder 11 shown in FIG. 5A and FIG. 5B is only one example and may be replaced by another layout.

When the substrate holder 11 that holds the test substrate Wt is soaked in the processing liquid 140 (for example, pure water) kept or retained in the processing tank 110A of the pre-wet module 110, the gas injection tube 221 is automatically connected with the substrate holder 11 to start injection of the gas into the internal space 13 of the substrate holder 11. While the injection of the gas into the internal space 13 of the substrate holder 11 continues (i.e., while the internal space 13 of the substrate holder 11 is kept under pressure), images of the processing liquid 140 are taken by the cameras 210 (the cameras 210A to 210F). When the gas bubbles 141 are detected in the processing liquid 140 as a result of analysis of the images (image data) taken by the cameras 210, this is detected as a leakage of the substrate holder 11.

In this illustrated example, the leakage detection apparatus 200 is provided in the pre-wet module 110. The leakage detection apparatus 200 may, however, be provided in another processing module (for example, the pre-soak rinse module 113 (or a pre-soak module) or the rinse module 114), as long as the processing module is configured to soak the substrate holder 11 into the liquid kept or retained in the tank. A tank for detection of a leakage (a tank that keeps or retains a liquid therein) may be provided separately for the purpose of detection of a leakage of the substrate holder 11.

The configuration of the embodiment uses the gas injection device 220 to inject the gas for the purpose of inspection of a leakage. One available procedure may perform a substrate treatment process in the state that a gas such as the air or an inert gas is injected into the internal space 13 of the substrate holder 11, which holds the actual substrate W that is to be actually plated, such as to increase the pressure of the internal space 13 of the substrate holder 11 to be higher than the pressure of the processing liquid, and thereby prevent a leakage of the substrate holder 11 in the course of processing of the actual substrate W (or suppress penetration of the processing liquid in the case of the presence of a leakage). This procedure may be configured to allow a small amount of leakage (release/discharge of gas bubbles into the processing liquid) caused by injection of the gas into the substrate holder 11. The amount of leakage to be allowed may be set to an appropriate reference value. When the amount of leakage exceeds the reference value, the procedure may stop the processing using the substrate holder 11 and the actual substrate W and may collect the substrate holder 11 and the actual substrate W. The amount of leakage may be detected by taking images of the processing liquid surrounding the substrate holder 11 with the cameras 210 to detect the amount of gas bubbles and/or providing a pressure sensor in the internal space 13 of the substrate holder 11 to detect the pressure (or a pressure change) in the internal space 13.

The injection of the gas into the internal space 13 of the substrate holder 11 that holds the actual substrate W may be performed by providing a gas injection device similar to the gas injection device 220, in the substrate attaching/detaching station 107, in the course of transfer by the transporter 121, and/or in each of the processing modules. The substrate holder 11 may be provided with a switching device (for example, a valve) 223 configured to open and close the passage 14 that communicates with the internal space 13. The switching device 223 may be opened to inject a gas into the internal space 13 via the passage 14 by the gas injection device and may be closed to seal the internal space 13 (shown in FIG. 5A and FIG. 5B). In the case where there is no need to seal the passage 14 after injection of the gas, the switching device 223 may be omitted. A pump for pressure reduction 232 is illustrated in the example of FIG. 5A and FIG. 5B. When there is no need to reduce the pressure in the internal space 13 of the substrate holder 11, the pump for pressure reduction 232 may be omitted. The substrate holder 11 that holds the actual substrate W may be a substrate holder that has been subjected to inspection of a leakage using the test substrate Wt or may be another substrate holder.

[Control Configuration]

FIG. 3 is an explanatory diagram illustrating a control configuration of the plating apparatus.

The plating apparatus 100 includes an operation screen computer 150 and a transfer machine-controlling controller 151 as the controller 800 configured to control the respective parts of the apparatus. The controller 800 also includes a camera-controlling controller 201. The controller 800 further includes a scheduler computer 152. The scheduler computer 152 may be an external computer that is shared by another plating apparatus or other plating apparatuses. All or part of the operation screen computer 150, the transfer machine-controlling controller 151, the camera-controlling controller 201, and the scheduler computer 152 may be integrated as one controller. In other words, the operation screen computer 150, the transfer machine-controlling controller 151, the camera-controlling controller 201, and the scheduler computer 152 may be configured by one single controller or by a plurality of controllers.

The operation screen computer 150 sends a signal of an operation command (including set parameters) to the transfer machine-controlling controller 151. The operation screen computer 150 may be configured to receive information, for example, results of control and a transfer sequence (transfer time table) from the transfer machine-controlling controller 151. The operation screen computer 150 may be, for example, a personal computer (PC) and includes a CPU 150A and a non-volatile and/or volatile memory 150B. The operation screen computer 150 may be provided with user interfaces including an input unit such as a keyboard and a mouse and an output unit such as a display. The operation screen computer 150 and the transfer machine-controlling controller 151 are connected with each other to be communicable with each other by wire and/or wirelessly. The operation screen computer 150 is provided inside or near to the plating apparatus 100 to be accessible by the user.

A storage medium configuring the memory 150B may include one or a plurality of arbitrary storage media, for example, a ROM, a RAM, a hard disk, a CD-ROM, a DVD-ROM, and a flexible disk. Programs stored in the memory include software configuring an operation screen application and/or programs for controlling the respective parts of the plating apparatus 100.

The transfer machine-controlling controller 151 is configured by, for example, a PLC or a sequencer to control the respective parts of the plating apparatus 100. The transfer machine-controlling controller 151 may be provided, for example, inside of the plating apparatus 100. As shown in FIG. 3, in response to reception of a signal of an operation command from the operation screen computer 150, the transfer machine-controlling controller 151 provides the scheduler computer 152 with information on apparatus conditions and receives data of a transfer time table from the scheduler computer 152. The transfer machine-controlling controller 151 sends a signal of a transfer machine operation command to a transfer machine 130 (for example, a servo motor or a cylinder), based on, for example, the operation command from the operation screen computer 150 and the transfer time table from the scheduler computer 152, so as to control the respective parts of the plating apparatus 100. The transfer machine 130 includes the transfer robots 103 and 104, the substrate holder transfer device 120, lift mechanisms placed in the respective processing modules, and other devices or equipment (for example, the gas injection device 220). The transfer machine-controlling controller 151 also controls one or a plurality of cameras 210 via the camera-controlling controller 201. The transfer machine-controlling controller 151 sends a signal of a camera determination command to the camera-controlling controller 201 and receives data on results of camera determination from the camera-controlling controller 201.

The scheduler computer 152 receives the information on apparatus conditions from the transfer machine-controlling controller 151, executes scheduling software (called scheduler) based on the apparatus conditions (the conditions of the plating apparatus 100) to generate a transfer sequence (transfer time table), and outputs the generated transfer sequence (transfer time table) to the transfer machine-controlling controller 151. Like the operation screen computer 150, the scheduler computer 152 may be, for example, a personal computer (PC) and includes a CPU 152A and a non-volatile and/or volatile memory 152B. Examples of the storage medium configuring the memory 152B are those described above with regard to the memory 150B. The scheduling software (scheduler) is stored in the memory 152B. The scheduler computer 152 may be provided with user interfaces including an input unit such as a keyboard and a mouse and an output unit such as a display.

The transfer machine-controlling controller 151 and the scheduler computer 152 are connected with each other to be communicable with each other by wire and/or wirelessly. The transfer machine-controlling controller 151 and the camera-controlling controller 201 are connected with each other to be communicable with each other by wire and/or wirelessly. The transfer machine-controlling controller 151 and the transfer machine 130 are connected with each other to be communicable with each other by wire and/or wirelessly.

In response to reception of the camera determination command from the transfer machine-controlling controller 151, the camera-controlling controller 201 sends a camera imaging command (signal) to the cameras 210 and receives images taken by camera imaging or camera-taken images (image data) from the cameras 210. The camera-controlling controller 201 analyzes the camera-taken images (image data), makes a determination and sends results of the determination to the transfer machine-controlling controller 151. Like the operation screen computer 150, the camera-controlling controller 201 may be configured to include a CPU and a memory. The camera-controlling controller 201 and the camera 210 are connected with each other to be communicable with each other by wire and/or wirelessly.

The configuration of the controller 800 described above is only an illustrative example and may be replaced by another configuration.

[Control Flow]

FIG. 4 is a flowchart showing a control procedure of detection of a leakage of the substrate holder 11.

At step S11, the operation screen computer 150 sends an operation command to the transfer machine-controlling controller 151. In response to the operation command from the operation screen computer 150, the transfer machine-controlling controller 151 sends information on the apparatus conditions (including a transfer time table generation command) to the scheduler computer 152. The scheduler computer 152 generates a transfer time table, based on the apparatus conditions provided by the transfer machine-controlling controller 151, and sends the generated transfer time table to the transfer machine-controlling controller 151. The scheduler computer 152 generates the transfer time table such that a leakage detection process of the substrate holder 11 using the test substrate Wt does not affect the throughput. This configuration enables a leakage detection process/leakage inspection process of the substrate holder 11 to be performed, while reducing or preventing the influence on the throughput during ordinary operation of the plating apparatus 100.

At step S12, the operation screen computer 150 determines whether there is any substrate holder 11 that is an object of leakage detection/leakage inspection. When there is any substrate holder 11 as the object of leakage detection, the processing flow proceeds to step S13. When there is no substrate holder 11 as the object of leakage detection, on the other hand, the processing flow repeats the processing of step S12.

At step S13, the transfer machine-controlling controller 151 sends a transfer machine operation command to the transfer machine 130 according to the transfer time table, such as to move the substrate holder 11 and the test substrate Wt to a detection process/inspection process position (to the pre-wet module 110 in the illustrated example).

At step S14, the transfer machine 130 moves the substrate holder 11 (that holds the test substrate Wt) to the detection process position. In one example, the transfer machine 130 (the transfer robot 104) takes out the test substrate Wt from the test substrate placing stage 106 and carries the test substrate Wt into the substrate attaching/detaching station 107. The transfer machine 130 (the transporter 121), on the other hand, takes out the substrate holder 11 from the stocker 108 and carries the test holder 11 into the substrate attaching/detaching station 107. After the substrate attaching/detaching device (107A, 107B) attaches the test substrate Wt to the substrate holder 11 in the substrate attaching/detaching station 107, the transfer machine 130 (the transporter 121) transfers and carries the substrate holder 11 that holds the test substrate Wt, to and into the pre-wet module 110.

At step S15, the transfer machine-controlling controller 151 controls the gas injection device 220 in the pre-wet module 110 to inject the gas into the internal space 13 of the substrate holder 11 (to pressurize the internal space 13). In the case where the pump for pressure reduction 232 (shown in FIG. 5A and FIG. 5B) is connected with the internal space 13 of the substrate holder 11, the transfer machine-controlling controller 151 may control the gas injection device 220 and the pump for pressure reduction 232 to repeat pressurization and pressure reduction of the internal space 13 of the substrate holder 11.

As shown in FIG. 5A, the pump for pressure reduction 232 may be connected with the gas injection tube 221 of the gas injection device 220 via a changeover device (for example, a three-way changeover valve) 240 and a piping 231, such as to make the internal space 13 of the substrate holder 11 selectively communicate with the gas supply source 222 or with the pump for pressure reduction 232. As shown in FIG. 5B, a passage 15 for pressure reduction (including an opening) that is different from a passage 14 for gas supply may be provided in the substrate holder 11, and the internal space 13 may be connected with the pump for pressure reduction 232 via the passage 15 for pressure reduction and the piping 231. In this case, a switching device (for example, valve) 233 may be provided in the passage 15 for pressure reduction. The switching device 233 may be opened to reduce the pressure in the internal space 13 via the passage 15 by the pump for pressure reduction 232 and may be closed to seal the internal space 13. When there is no need to seal the passage 15 after injection of the gas, the switching device 233 may be omitted.

Pressurization of the internal space 13 of the substrate holder 11 aims to suppress/prevent a false detection by checking the state when the pressure in the internal space 13 of the substrate holder 11 is increased. More specifically, increasing the pressure in the internal space 13 of the substrate holder 11 makes it easier for the gas to move from the internal space 13 into the processing liquid in the case where there is a leakage in the substrate holder 11 and thereby facilitates generation of gas bubbles in the processing liquid. This configuration discriminates the gas bubbles caused by the leakage from gas bubbles caused by the air originally adhering to the surface of the substrate holder 11 and thereby prevents a false detection. In the configuration of repeating pressurization and pressure reduction of the internal space 13 of the substrate holder 11, checking a change in release/discharge speed of gas bubbles from the internal space 13 more effectively suppresses/prevents a false detection. In the configuration of repeating pressurization and pressure reduction of the internal space 13 of the substrate holder 11, the release speed of gas bubbles from the internal space 13 changes when the substrate holder 11 has a leakage. The amount of the gas bubbles caused by the air originally adhering to the surface of the substrate holder 11, however, does not change by pressurization or pressure reduction of the internal space 13.

The pressure reduction of the internal space 13 of the substrate holder 11 is performed, such that the pressure in the internal space 13 is maintained equal to or higher than an internal pressure of the processing tank 110A (the pressure of the processing liquid 140) or equal to or higher than a total pressure obtained by adding a predetermined pressure (margin) to the internal pressure of the processing tank 110A. The lower limit of the pressure in the internal space 13 should thus be equal to or higher than the pressure of the processing liquid. When there is a need to take into account a depth-induced difference in pressure of the processing liquid, the lower limit of the pressure in the internal space 13 should be equal to or higher than a pressure in a deepest part of the processing tank 110A or should be equal to or higher than a pressure in a lowest part of the substrate holder 11 (or in a lowest part of the internal space 13). This configuration allows the lower limit of the pressure in the internal space 13 to be maintained at least equal to or higher than the pressure of the processing liquid at any location in the internal space 13 and always pressurizes the internal space 13 of the substrate holder 11 to be equal to or higher than the pressure of the processing liquid (to be higher than the atmospheric pressure). This prevents the pressure in the internal space 13 of the substrate holder 11 from being lower than the pressure of the processing liquid and avoids the processing liquid from being sucked into the internal space 13 to cause or expand a leakage.

When there is a leakage in the substrate holder 11, the degree/amount of the leakage of gas bubbles depends on a differential pressure between inside and outside of the substrate holder (internal pressure of the substrate holder−pressure of the processing liquid). It is accordingly preferable to control the internal pressure of the substrate holder, such that the differential pressure between inside and outside of the substrate holder (internal pressure of the substrate holder−pressure of the processing liquid) is equal to or larger than a predetermined value during a partial period or an entire period of a leakage inspection. The internal pressure of the substrate holder herein denotes the pressure in the internal space 13 of the substrate holder 11. The predetermined value denotes a value of differential pressure between inside and outside of the substrate holder that causes a detectable amount of gas bubbles to be released/discharged from the internal space 13 when there is a leakage in the substrate holder 11, and is obtained in advance by experiment or the like.

With regard to pressurization of the internal space 13 of the substrate holder 11, an upper limit of the pressure in the internal space 13 is to be set in such a range that does not newly cause a leakage due to deformation of the substrate. Pressurization of the internal space 13 of the substrate holder 11 may cause a convex deformation of the substrate or increase a convex deformation of the substrate and may newly cause a leakage that is not present prior to the deformation or prior to the increase of the deformation, depending on a pressing force of the seal 12A against the substrate. The setting of the upper limit of the pressure in the internal space 13 needs to suppress the occurrence of such a new leakage. Especially a rectangular substrate has a large area and tends to be thin and soft, so that there is a need to pay attention to the possibility of deformation of such a substrate by the pressure in the internal space 13.

Furthermore, in the configuration of repeating pressurization and pressure reduction of the internal space 13, an excessively wide range of allowable pressure change in the internal space 13 (an excessively large difference between an upper limit and a lower limit of the pressure) is likely to cause deformation of the substrate as in the case described above and to facilitate a leakage. The range of the allowable pressure change should thus be within a predetermined range that does not cause a leakage due to deformation of the substrate. In other words, the upper limit value and the lower limit value of pressure in the internal space 13 should be set respectively, such that a difference between the upper limit value and the lower limit value is within a predetermined range.

At step S16, the camera-controlling controller 201 sends an imaging command to the cameras 210 (to the cameras 210A to 210F in the illustrated example), in response to a camera determination command from the transfer machine-controlling controller 151. The cameras 210 (the cameras 210A to 210F in the illustrated example) perform imaging of the processing liquid 140 surrounding the substrate holder 11, in response to the imaging command from the camera-controlling controller 201, and complete imaging (steps S17 and S18). In this case, the cameras 210 may be configured to take a predetermined number of images over a predetermined time period.

At step S19, the transfer machine-controlling controller 151 sends a transfer machine operation command to the transfer machine 130, such as to move the substrate holder 11 (that holds the test substrate Wt) from the detection process position (the pre-wet module 110 in the illustrated example), to place the substrate holder 11 into the stocker 108 and to place the test substrate Wt onto the test substrate placing stage 106.

At step S20, the transfer machine 130 completes moving of the substrate holder 11 and the test substrate Wt. The transfer machine 130 (the transporter 121) moves the substrate holder 11 (that holds the test substrate Wt) from the pre-wet module 110 to the blow module 113, which performs a rough drying process of the substrate holder 11 and the test substrate Wt, and subsequently moves the substrate holder 11 and the test substrate Wt from the blow module 113 to the substrate attaching/detaching station 107. In the substrate attaching/detaching station 107, the substrate attaching/detaching device (107A and 107B) detaches the test substrate Wt from the substrate holder 11. The substrate holder 11 is transferred to the stocker 108 and is placed into the stocker 108 by the transfer machine 130 (the transporter 121). The test substrate Wt is, on the other hand, transferred by the transfer robot 104 to the cleaner 105 to be subjected to a cleaning and drying process and is subsequently transferred and placed by the transfer robot 103 to and onto the test substrate placing stage 106.

At step S21, the camera-controlling controller 201 analyzes the taken image data of the processing liquid 140 and determines whether gas bubbles are present in the processing liquid 140. When no gas bubbles are present (when the substrate holder 11 has no leakage), the processing flow proceeds to step S22 to continue the use of the substrate holder 11 (to attach the actual substrate W to the substrate holder 11 and use the substrate holder 11 with the actual substrate W for a plating process). When gas bubbles are present (when the substrate holder 11 has a leakage), on the other hand, the processing flow proceeds to step S23 not to use the substrate holder 11.

For example, a procedure of analysis of image data (image recognition and determination) provides a reference image without the presence of any leakage, compares an image taken by the camera 210 in the leakage detection process with the reference image, and determines the presence or the absence of a leakage (the presence or the absence of gas bubbles), based on determination of whether a ratio of pixels (%) different from those of the reference image exceeds a threshold value (%) in the taken image. When the ratio of the pixels different from those of the reference image is higher than the threshold value, it is determined that there are gas bubbles, i.e., that there is a leakage. When the ratio of the pixels different from those of the reference image are equal to or lower than the threshold value, on the other hand, it is determined that there are no gas bubbles, i.e., there is no leakage. In the case of analysis of a plurality of taken images, for example, it may be determined that there are gas bubbles, i.e., that there is a leakage, when the ratio of pixels different from those of the reference image is higher than the threshold value in one taken image among the plurality of taken images. In another example, it may be determined that there are gas bubbles, i.e., that there is a leakage, when the ratio of pixels different from those of the reference image is higher than the threshold value in a predetermined number or a larger number of taken images. In the configuration of repeating pressurization/pressure reduction of the internal space of the substrate holder, a procedure may analyze a plurality of taken images and check a change in release speed of gas bubbles from the internal space of the substrate holder for the purpose of discrimination from gas bubbles originally adhering to the substrate holder. For example, even in the case where the ratio of pixels different from those of the reference image exceeds the threshold value in one taken image or in a plurality of taken image, when there is no substantial change in release speed of gas bubbles during repetition of pressurization/pressure reduction of the internal space of the substrate holder, it may be determined that the result of the analysis is ascribed to the gas bubbles originally adhering to the substrate holder and that there is no leakage.

Another procedure may detect a leakage by AI (artificial intelligence) or by machine learning. For example, this procedure may perform machine learning of AI or machine learning software by using a plurality of images determined to be without any leakage and with a leakage, as teacher data, and may determine whether an image taken by the camera 210 in the leakage detection process shows the presence of a leakage or the absence of a leakage by the AI or by the machine learning software. In the case of analysis of a plurality of taken images, the procedure may analyze each of the taken images and may settle the determination of the presence of a leakage when it is determined that there is a leakage in one taken image or may settle the determination of the presence of a leakage when it is determined, in a predetermined number or a larger number of taken images, that there is a leakage. In the configuration of repeating pressurization/pressure reduction of the internal space of the substrate holder, the procedure may perform machine learning of AI or machine learning software by using a plurality of images determined to be without any leakage and with a leakage, with taking into account a change in release speed of gas bubbles from the internal space of the substrate holder (discrimination from gas bubbles originally adhering to the substrate holder), as teacher data, and may analyze a plurality of taken images to determine whether there is a leakage or not.

(1) One modified configuration may additionally be provided with a leakage detection unit working on the basis of the state that the pressure in the internal space 13 of the substrate holder 11 in the process of injection of the gas by the gas injection device 220 does not reach a predetermined reference value, as an auxiliary unit of the above embodiment (the leakage detection unit by using the cameras 210). In the case where the substrate holder 11 has a high degree of leakage (a large leakage), the pressure in the internal space 13 of the substrate holder 11 may not reach the predetermined reference value. For example, even in the case of a failure in detection of a leakage by the detection of gas bubbles using the camera 210, when the pressure in the internal space 13 of the substrate holder 11 in the process of injection of the gas by the gas injection device 220 does not reach the predetermined reference value, this modified configuration may detect a leakage of the substrate holder 11. For example, a pressure sensor may be provided inside of the internal space 13 of the substrate holder 11 to detect a pressure in the internal space 13 of the substrate holder 11.

(2) Another modified configuration may detect an abnormality of the substrate holder 11 (giving an alarm) in the case where the pressure in the internal space 13 of the substrate holder 11 is not increased, in spite of the supply of the gas into the internal space 13 by the gas injection device 220, and where gas bubbles are not detected by the camera 210. The state that the pressure in the internal space 13 is not increased denotes a case where an increase in pressure in the internal space 13 in a predetermined time period does not reach a predetermined reference value or a case where a rise rate of the pressure in the internal space 13 does not reach a predetermined reference value.

(3) Another modified configuration may pressurize the internal space 13 of the substrate holder 11 in advance in the substrate attaching/detaching station 107 or in the course of transfer by the transporter 121 and perform a leakage inspection, before the substrate holder 11 that holds the test substrate Wt is carried into the pre-wet module 110. This modified configuration prevents the processing liquid 140 from entering the internal space 13 of the substrate holder 11 prior to pressurization of the internal space 13 of the substrate holder 11 in the pre-wet module 110, even in the case where the substrate holder 11 with the presence of a leakage is placed into the processing tank 110A of the pre-wet module 110. In this modified configuration, a gas injection device similar to the gas injection device 220 is provided in the substrate attaching/detaching station 107 or in the transporter 121. The substrate holder 11 may be provided with a switching device (for example, a valve) 223 configured to open and close the passage 14 that communicates with the internal space 13. The switching device 223 may be opened to inject a gas into the internal space 13 via the passage 14 by the gas injection device and may be closed to seal the internal space 13 (shown in FIG. 5A and FIG. 5B). In the case where there is no need to seal the passage 14 after injection of the gas, the switching device 223 may be omitted. The pump for pressure reduction 232 is also illustrated in FIG. 5A and FIG. 5B. When there is no need to reduce the pressure in the internal space 13 of the substrate holder 11, the pump for pressure reduction 232 may be omitted. In the case where the internal space 13 of the substrate holder 11 is pressurized in advance, the gas injection device 220 may be omitted from the pre-wet module 110.

A further modified configuration may pressurize the internal space 13 of the substrate holder 11 in advance before the substrate holder 11 is carried into the pre-wet module 110 and may additionally use the gas injection device 220 and the pump for pressure reduction 232 in the pre-wet module 110 to achieve pressurization and pressure reduction of the internal space 13 of the substrate holder 11 in a similar manner to that described above to perform a leakage inspection.

Other Embodiments (1) The configuration of the above embodiment uses a plurality of cameras 210 for detection of a leakage. Another embodiment may use a fisheye lens, an omnidirectional (360-degree) camera or the like and may take an image of the processing liquid surrounding the substrate holder 11 by one single camera for the purpose of detection of a leakage. The number of cameras used may be decreased by using a camera that is capable of imaging a wide range and/or placing a camera at a position that is capable of imaging a wide range. For example, placing the cameras 210A to 210F of FIG. 2A at positions farther from the substrate holder 11 in an allowable range of the spatial restriction and/or the imaging quality allows for imaging of a wider range with each camera. This configuration can thus reduce the number of cameras used.

(2) The configuration of the above embodiment uses the test substrate Wt to perform the leakage detection process of the substrate holder 11. Another embodiment may use the actual substrate W that is to be actually plated, to perform the leakage detection process of the substrate holder 11. The configuration of this embodiment may take an image of the processing liquid with the camera in the same manner as that described above when the substrate holder 11 that holds the actual substrate W is soaked into the processing liquid in the processing tank during transfer of the substrate holder 11 with the actual substrate W to the ordinary plating module 115, or after transfer of the substrate holder 11 with the actual substrate W to the ordinary plating module 115 (e.g. after processing of the substrate holder 11 with the actual substrate W at the ordinary plating module 115), and may perform the leakage detection process by determining whether gas bubbles are generated in the processing liquid. In the case of using the actual substrate W for the leakage detection process of the substrate holder 11, the leakage detection process may be performed in part or all of the plurality of processing tanks which the actual substrate W is carried into. In the case where the internal space 13 of the substrate holder 11 can be sealed after pressurization of the internal space 13, the gas injection device 220 may be omitted in part or all of the processing tanks which the actual substrate W is carried into after the pressurization and sealing.

(3) In the configuration of the above embodiment, the cameras 210 are placed on the front side and on the rear side of the substrate holder 11. In the case of using the substrate holder 11 for single-sided plating, however, the cameras 210 may be placed only on the side of a plating surface or a surface to be plated.

At least the following aspects are provided from the description of the above embodiments.

[1] According to one aspect, there is provided a method of detecting a leakage that detects a leakage of a substrate holder in an apparatus for plating. The method of detecting the leakage comprises: placing the substrate holder that holds a substrate, into a tank that is filled with a liquid; supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid and thereby detect a leakage of the substrate holder. The substrate includes an actual substrate and a test substrate, i.e. the substrate may be an actual substrate or a test substrate. "The state that the internal space of the substrate holder is pressurized" means the state that the pressure in the internal space of the substrate holder is increased to be higher than the atmospheric pressure and more specifically to be equal to or higher than the pressure of a processing liquid.

The configuration of this aspect takes an image of the liquid surrounding the substrate holder in the state that the internal space of the substrate holder is pressurized and analyzes the taken image to perform image recognition for the presence or the absence of gas bubbles and thereby detect a leakage of the substrate holder. This configuration avoids the difficulty in adjustment of the reference value in the electrical continuity technique and the difficulty in detection of a leakage at some location where the electrode for detection is placed. This configuration also enables detection of a leakage of the substrate holder to be performed with high accuracy, compared with the differential pressure technique. Furthermore, the configuration of taking an image of the liquid surrounding the substrate holder in the state that the internal space of the substrate holder is pressurized facilitates release of gas bubbles from the substrate holder into the liquid in the case where the substrate holder has a leakage and thereby enhances the accuracy of detection of a leakage.

[2] According to one aspect, in the method of detecting the leakage, the substrate may be a test substrate that is not subjected to a plating process.

The configuration of this aspect enables detection of a leakage of the substrate holder to be performed without using a substrate that is to be actually plated. This configuration prevents the substrate that is to be actually plated from coming into contact with the substrate holder and being exposed to a liquid so as to be not usable for a subsequent plating process.

[3] According to one aspect, the taking the image of the liquid to detect a leakage of the substrate holder detects a leakage of the substrate holder by using the test substrate in a time period that does not affect a throughput.

The configuration of this aspect enables detection of a leakage of the substrate holder to be performed in parallel with an ordinary operation of the apparatus for plating, with a view to not affecting the throughput.

[4] According to one aspect, the method of detecting the leakage may further comprise changing the pressure in the internal space of the substrate holder by controlling supply and discharge of the gas into and from the internal space.

The configuration of this aspect changes the pressure in the internal space of the substrate holder and thereby causes the release speed of gas bubbles from the internal space of the substrate holder to change in the case of the presence of a leakage. This configuration more effectively discriminates the gas bubbles caused by the leakage from the gas bubbles caused by the air originally adhering to the substrate holder.

[5] According to one aspect, the method of detecting the leakage may further comprise providing a reference image without any leakage, and the taking the image of the liquid to detect a leakage of the substrate holder compares the one or plurality of taken images with the reference image, and when a ratio of different pixels exceeds a reference value in a predetermined number of images, determines that gas bubbles are present in the liquid and that the substrate holder has a leakage.

The configuration of this aspect enables a leakage to be detected with high accuracy by a relatively simple process.

[6] According to one aspect, the method of detecting the leakage may further comprise performing machine learning of a program configured to detect a leakage of the substrate holder by using a plurality of images determined to be without any leakage and with a leakage of the substrate holder, as teacher data, and the taking the image of the liquid to detect a leakage of the substrate holder analyzes the one or plurality of taken images by the program to determine presence or absence of a leakage of the substrate holder.

The configuration of this aspect enables a leakage to be detected with high accuracy by machine learning. This configuration also enables the result of detection of a leakage to be promptly reflected on teacher data and thereby enhances the accuracy of determination.

[7] According to one aspect, the method of detecting the leakage may further comprise using a substrate that is to be actually plated, to perform detection of a leakage of the substrate holder that has been processed by a leakage detection process using the test substrate and/or detection of a leakage of another substrate holder.

The configuration of this aspect performs detection of a leakage of the substrate holder in the course of transfer of the substrate that is to be actually plated and thus enables a leakage of the substrate holder to be continuously monitored.

[8] According to one aspect, the method of detecting the leakage may further comprise detecting the pressure in the internal space of the substrate holder when the gas is supplied into the internal space of the substrate holder; and when the detected pressure does not reach a predetermined reference value, detecting a leakage of the substrate holder.

The configuration of this aspect enables detection of a leakage of the substrate holder to be performed even in the state that the substrate holder has a high degree of leakage and the pressure in the internal space of the substrate holder does not reach the reference value (even in the case of a large leakage). This configuration provides auxiliary means in the case of a failure in detection of gas bubbles (detection of a leakage) with a camera or the like and thereby further enhances the accuracy of detection of a leakage of the substrate holder.

[9] According to one aspect, the method of detecting the leakage may further comprise detecting an increase in the pressure in the internal space of the substrate holder in a predetermined time period when the gas is supplied into the internal space of the substrate holder; and when the increase in the pressure does not reach a predetermined reference value and no gas bubbles in the liquid are detected, detecting an abnormality of the substrate holder.

The configuration of this aspect detects an abnormality with the assumption that some abnormality occurs in the substrate holder, in a connecting portion of the substrate holder with a gas injection device or the like, when the pressure in the internal space of the substrate holder is not increased and no gas bubbles are detected, in spite of pressurization of the internal space.

[10] According to one aspect, the method of detecting the leakage may comprise supplying the gas into the internal space of the substrate holder, after the substrate holder is placed in the tank.

The configuration of this aspect places a gas injection device at a location where inspection of a leakage is performed, to supply the gas to the substrate holder at a required location and at a required timing. There is accordingly no need to transfer the substrate holder to the location where inspection of a leakage is performed in the state that the internal space of the substrate holder is sealed after introduction of the gas into the internal space.

[11] According to one aspect, the method of detecting the leakage may comprise supplying the gas into the internal space of the substrate holder, before the substrate holder is placed in the tank. \

The configuration of this aspect fills the internal space of the substrate holder with the gas (pressurizes the internal space) before the substrate holder is placed into the tank and thereby suppresses/prevents the liquid from entering the internal space of the substrate holder before pressurization of the internal space of the substrate holder in the case where the substrate holder having a leakage is placed in the tank.

[12] According to one aspect, the method of detecting the leakage may further comprise controlling supply and discharge of the gas into and from the internal space of the substrate holder to change the pressure in the internal space, after the substrate holder is placed in the tank.

The configuration of this aspect fills the internal space of the substrate holder with the gas before the substrate holder is placed into the tank and thereby suppresses/prevents the liquid from entering the internal space immediately after the substrate holder is placed into the tank. This configuration also changes the pressure in the internal space of the substrate holder after the substrate holder is placed into the tank and thereby causes the release speed of gas bubbles from the internal space of the substrate holder to change in the case of the presence of a leakage. This configuration more effectively discriminates the gas bubbles caused by the leakage from the gas bubbles caused by the air originally adhering to the substrate holder.

[13] According to one aspect, in the method of detecting the leakage, the supplying the gas into the internal space of the substrate holder may comprise setting an upper limit value of the pressure in the internal space of the substrate holder to a range that does not cause a leakage by deformation of the substrate due to an increase in the pressure in the internal space.

The configuration of this aspect suppresses/prevents the pressure in the internal space of the substrate holder from becoming excessively high to deform the substrate and cause a leakage.

[14] According to one aspect, in the method of detecting the leakage, the changing the pressure in the internal space of the substrate holder may comprise setting a lower limit value of the pressure in the internal space of the substrate holder to be equal to or higher than a pressure of the liquid surrounding the substrate holder.

The configuration of this aspect suppresses/prevents the pressure in the internal space of the substrate holder from becoming lower than the pressure of the liquid in the tank and thereby suppresses/prevents the liquid from entering the internal space (leakage).

[15] According to one aspect, in the method of detecting the leakage, the changing the pressure in the internal space of the substrate holder may comprise setting a range of the change in the pressure in the internal space of the substrate holder to a range that does not cause a leakage by deformation of the substrate due to the change in the pressure.

The configuration of this aspect suppresses/prevents the change in the pressure in the internal space of the substrate holder from becoming excessively large to deform the substrate and cause a leakage.

[16] According to one aspect, there is provided a method of plating, comprising: the respective processes with regard to the method of detecting the leakage described above; and causing a substrate that is to be actually plated, to be held by the substrate holder that has been processed by the method of detecting the leakage and/or by another substrate holder, and performing a plating process of the substrate in a state that a gas is supplied into an internal space of the substrate holder to prevent a leakage of the substrate holder and/or to suppress the liquid from entering the internal space of the substrate holder. The injection of the gas into the internal space of the substrate holder may be performed in a substrate attaching/detaching station, in the course of transfer by a transporter, and/or in each of processing modules (preferably a processing module which the substrate holder is first carried into).

The configuration of this aspect enables a leakage detection process of the substrate holder to be performed and also prevents a leakage of the substrate holder and/or suppresses the liquid from entering the internal space of the substrate holder in a process of plating an actual substrate. A modified configuration may perform inspection of a leakage in one or a plurality of processing tanks, while preventing a leakage of the substrate holder that holds the actual substrate and/or suppresses the liquid from entering the internal space of the substrate holder.

[17] According to one aspect, there is provided a non-volatile storage medium configured to store therein a program that causes a computer to perform a command for detecting a leakage of a substrate holder in an apparatus for plating, wherein the command comprises: placing the substrate holder that holds a substrate, into a tank that is filled with a liquid; supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid and thereby detect a leakage of the substrate holder.

[18] According to one aspect, there is provided an apparatus for detecting a leakage that detects a leakage of a substrate holder in an apparatus for plating. The apparatus for detecting the leakage comprises a gas injection device configured to supply a gas into an internal space of a substrate holder that holds a substrate; one or a plurality of cameras configured to take an image of a liquid surrounding the substrate holder in a state that the substrate holder having the internal space pressurized by the gas is soaked in the liquid in a tank; and a control device configured to analyze one or a plurality of taken images to determine presence or absence of gas bubbles in the liquid and thereby detect a leakage of the substrate holder.

The configuration of this aspect takes an image of the liquid surrounding the substrate holder in the state that the internal space of the substrate holder is pressurized and analyzes the taken image to perform image recognition for the presence or the absence of gas bubbles and thereby detect a leakage of the substrate holder. This configuration avoids the difficulty in adjustment of the reference value in the electrical continuity technique and the difficulty in detection of a leakage at some location where the electrode for detection is placed. This configuration also enables detection of a leakage of the substrate holder to be performed with high accuracy, compared with the differential pressure technique. Furthermore, the configuration of taking an image of the liquid surrounding the substrate holder in the state that the internal space of the substrate holder is pressurized facilitates release of gas bubbles from the substrate holder into the liquid in the case where the substrate holder has a leakage and thereby enhances the accuracy of detection of a leakage.

[19] According to one aspect, there is provided an apparatus for plating, comprising: the apparatus for detecting the leakage described above; the substrate holder; and the tank that keeps and retains the liquid therein.

[20] According to one aspect, the apparatus for plating may further comprise a test substrate to be held by the substrate holder.

Although the embodiments of the present invention have been described based on some examples, the embodiments of the invention described above are presented to facilitate understanding of the present invent ion, and do not limit the present invention. The present invention can be altered and improved without departing from the subject matter of the present invention, and it is needless to say that the present invention includes equivalents thereof. In addition, it is possible to arbitrarily combine or omit respective constituent elements described in the claims and the specification in a range where at least a part of the above-mentioned problem can be solved or a range where at least a part of the effect is exhibited.

REFERENCE SIGNS LIST

11 substrate holder
12, 12A, 12B seals
13 internal space
100 plating apparatus
101A loading/unloading station
101B processing station
102 cassette table
103 transfer robot
104 transfer robot
105 cleaner
105A temporary placing table
106 test substrate placing stage
107 substrate attaching/detaching station
107A rotating device (substrate attaching/detaching device)
107B support station (substrate attaching/detaching device)
108 stocker
109 substrate holder cleaning device
110 pre-wet module
110A processing tank
111 temporary placing table 112 pre-soak rinse module
113 blow module
114 rinse module
115 plating process module
120 substrate holder transfer device
121 transporter
122 rail
130 transfer machine
140 processing liquid
141 gas bubbles
150 operation screen computer
150A CPU
150B memory
151 transfer machine-controlling controller
152 scheduler computer
152A CPU
152B memory
200 leakage detection apparatus
201 camera-controlling controller
210 camera
220 gas injection device
221 gas injection tube
222 gas supply source
W substrate
Wt test substrate

What is claimed is:

1. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein a reference image without any leakage is provided, and wherein the taking the image of the liquid to detect a leakage of the substrate holder compares the one or plurality of taken images with the reference image, and when a ratio of different pixels exceeds a reference value in a predetermined number of images, determines that gas bubbles are present in the liquid and that the substrate holder has a leakage.

2. The method of detecting the leakage according to claim 1, comprising:

supplying the gas into the internal space of the substrate holder, after the substrate holder is placed in the tank.

3. The method of detecting the leakage according to claim 1, wherein the substrate is a test substrate that is not subjected to a plating process.

4. The method of detecting the leakage according to claim 3, wherein the taking the image of the liquid to detect a leakage of the substrate holder detects a leakage of the substrate holder by using the test substrate in a time period that does not affect a throughput of the apparatus for plating.

5. The method of detecting the leakage according to claim 1, further comprising:

changing the pressure in the internal space of the substrate holder by controlling supply and discharge of the gas into and from the internal space.

6. The method of detecting the leakage according to claim 5, wherein the changing the pressure in the internal space of the substrate holder comprises setting a lower limit value of the pressure in the internal space of the substrate holder to be equal to or higher than a pressure of the liquid surrounding the substrate holder.

7. The method of detecting the leakage according to claim 1, comprising:

supplying the gas into the internal space of the substrate holder, before the substrate holder is placed in the tank.

8. The method of detecting the leakage according to claim 7, further comprising:

controlling supply and discharge of the gas into and from the internal space of the substrate holder to change the pressure in the internal space, after the substrate holder is placed in the tank.

9. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the taking the image of the liquid to detect a leakage of the substrate holder comprises:

perform machine learning of a program configured to detect a leakage of the substrate holder by using a plurality of images determined to be without any leakage and with a leakage of the substrate holder, as teacher data, and wherein the taking the image of the liquid to detect a leakage of the substrate holder analyzes the one or plurality of taken images by the program to determine presence or absence of a leakage of the substrate holder.

10. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the method comprises:

using a substrate that is to be actually plated, to perform detection of a leakage of the substrate holder that has been processed by a leakage detection process using the test substrate.

11. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the method further comprises:

detecting the pressure in the internal space of the substrate holder when the gas is supplied into the internal space of the substrate holder; and when the detected pressure does not reach a predetermined reference value, detecting a leakage of the substrate holder.

12. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the method further comprises:

detecting an increase in the pressure in the internal space of the substrate holder in a predetermined time period when the gas is supplied into the internal space of the substrate holder; and when the increase in the pressure in the internal space of the substrate holder in a predetermined time period does not reach a predetermined reference value and no gas bubbles in the liquid are detected, detecting an abnormality of the substrate holder.

13. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the supplying the gas into the internal space of the substrate holder comprises setting an upper limit value of the pressure in the internal space of the substrate holder to a range that does not cause a leakage by deformation of the substrate due to an increase in the pressure in the internal space.

14. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the method further comprising changing the pressure in the internal space of the substrate holder by controlling supply and discharge of the gas into and from the internal space, and wherein the changing the pressure in the internal space of the substrate holder comprises setting a range of the change in the pressure in the internal space of the substrate holder to a range that does not cause a leakage by deformation of the substrate due to the change in the pressure.

15. A non-volatile storage medium configured to store therein a program that causes a computer to perform a command for detecting a leakage of a substrate holder in an apparatus for plating, wherein the command comprises:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid and detect a leakage of the substrate holder, wherein a reference image without any leakage is provided, and wherein the taking the image of the liquid to detect a leakage of the substrate holder compares the one or plurality of taken images with the reference image, and when a ratio of different pixels exceeds a reference value in a predetermined number of images, determines that gas bubbles are present in the liquid and that the substrate holder has a leakage.

16. A method of detecting a leakage that detects a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas and analyzing one or a plurality of taken images to determine presence or absence of gas bubbles in the liquid to detect a leakage of the substrate holder, wherein the method comprises:

using a substrate that is to be actually plated, to perform detection of a leakage of the substrate holder with the substrate holder holding the substrate that is to be actually plated.

17. An apparatus for detecting a leakage that detects a leakage of a substrate holder in an apparatus for plating, the apparatus for detecting the leakage comprising:

a gas injection device configured to supply a gas into an internal space of a substrate holder that holds a substrate;

one or a plurality of cameras configured to take an image of a liquid surrounding the substrate holder in a state that the substrate holder having the internal space pressurized by the gas is soaked in the liquid in a tank;

a control device configured to analyze one or a plurality of taken images to determine presence or absence of gas bubbles in the liquid and to detect a leakage of the substrate holder; and a memory that stores a reference image without any leakage, wherein the control device compares the one or plurality of taken images with the reference image, and when a ratio of different pixels exceeds a reference value in a predetermined number of images, determines that gas bubbles are present in the liquid and that the substrate holder has a leakage.

18. An apparatus for plating, comprising:

the apparatus for detecting the leakage according to claim 17.

19. The apparatus for plating according to claim 18, wherein the substrate is a test substrate that is not subjected to a plating process.

20. A method of plating, comprising:

detecting a leakage of a substrate holder in an apparatus for plating, the method of detecting the leakage comprising:

placing the substrate holder that holds a substrate, into a tank that is filled with a liquid;

supplying a gas into an internal space of the substrate holder that seals an outer circumferential portion of the substrate; and taking an image of the liquid surrounding the substrate holder in a state that the internal space of the substrate holder is pressurized by the gas while changing the pressure in the internal space of the substrate holder by controlling supply and discharge of the gas into and from the internal space, and analyzing one or a plurality of taken images to determine presence or absence of gas bubbles in the liquid to detect a leakage of the substrate holder, causing a substrate that is to be actually plated, to be held by the substrate holder, and performing a plating process of the substrate in a state that a gas is supplied into an internal space of the substrate holder to prevent a leakage of the substrate holder and/or to suppress the liquid from entering the internal space of the substrate holder.

* * * * *